United States Patent [19]

Vernet et al.

[11] Patent Number: 5,322,401
[45] Date of Patent: Jun. 21, 1994

[54] DOWEL WITH ROCKER, CAST IN A SINGLE PIECE, AND ITS METHOD OF CASTING

[75] Inventors: Franck Vernet; Jean-Paul Barthomeuf, both of Bourg De Peage, France

[73] Assignee: Societe de Prospection et d'Inventions Techniques, Cedex, France

[21] Appl. No.: 980,069

[22] Filed: Nov. 23, 1992

[30] Foreign Application Priority Data

Nov. 22, 1991 [FR] France ................... 91 14377

[51] Int. Cl.⁵ .................... F16B 21/00; B29B 7/00
[52] U.S. Cl. ........................ 411/344; 411/345; 411/908; 264/328.8
[58] Field of Search ............ 411/340, 344, 345, 908; 264/242, 328.1, 328.8

[56] References Cited

U.S. PATENT DOCUMENTS

| 3,288,014 | 11/1966 | Mortensen | 411/344 |
| 3,707,898 | 1/1973 | Holly | 411/344 |
| 3,782,238 | 1/1974 | Polos | 411/345 |
| 4,186,645 | 2/1980 | Zaydel | 411/908 X |
| 5,067,864 | 11/1991 | Dewey et al. | 411/344 |
| 5,108,240 | 4/1992 | Liebig | 411/344 |

FOREIGN PATENT DOCUMENTS 1152070  5/1969  United Kingdom ............... 411/345

Primary Examiner—Neill R. Wilson
Attorney, Agent, or Firm—Schwartz & Weinrieb

[57] ABSTRACT

The dowel comprises a body (1), with two elongate lateral arms (4), each having a groove, and a bore, opening out between the arms (4) for a fixing screw (22) to pass through, a rocker (2) sliding and pivoting on the arms (4) of the body (1) by means of two pivots (10) in their grooves, with a ramp which interacts with the end of the screw (22) in order to cause the rocker (2) to pivot, and an orifice for interacting, in the tilted position, with the fixing screw (22) and causing the rocker (2) to slide.

Shearable pins (19) are provided for temporarily holding the rocker (2), detachable under the action of the screw (22), and which, when the dowel is inserted into a wall, drive the rocker (2) with the body (1). The body (1) and the rocker (2) are moulded simultaneously a single piece from injectable material.

The dowel can be used for fixing a component to a gypsum board.

18 Claims, 4 Drawing Sheets

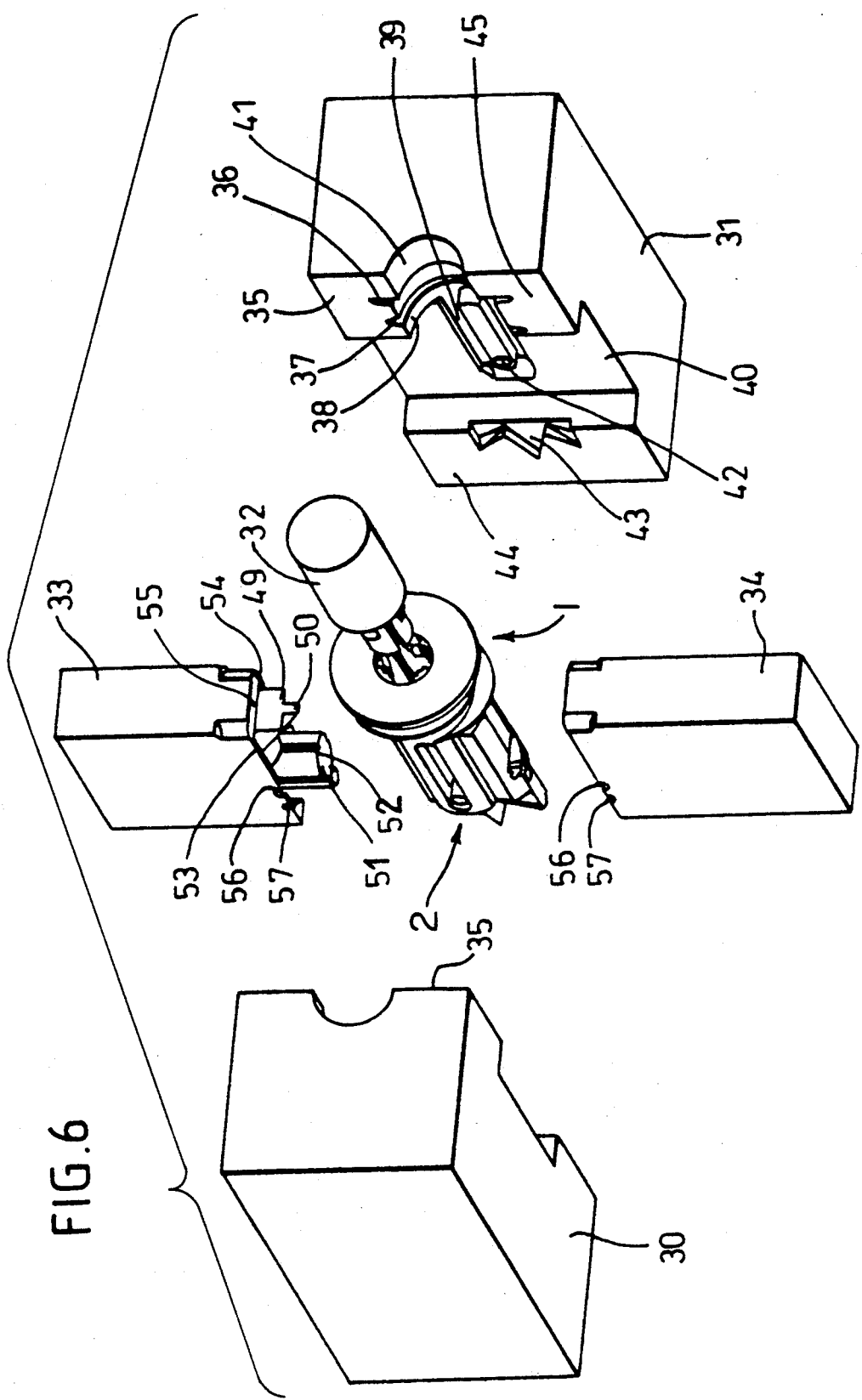

DOWEL WITH ROCKER, CAST IN A SINGLE PIECE, AND ITS METHOD OF CASTING

FIELD OF THE INVENTION

The present invention relates to a dowel with a rocker for fixing a component to a support wall comprising a body with a generally tubular shape, with two elongate lateral arms, each having a groove, and a bore opening out between the arms for a screw to pass through for fixing the dowel and component, a rocker mounted so as to slide and pivot on the arms of the body by means of two pivots located in their grooves, with a ramp for interacting with the end of the screw so as to cause the rocker to pivot from a position in which the dowel is inserted in the wall, in which it is aligned with the arms, to a tilted position, in which it is perpendicular to the arms, and an orifice for interacting, in the tilted position, with the fixing screw and causing the rocker to slide perpendicular to the arms of the body into a fixing position, and means for temporarily holding the rocker in the insertion position between the arms of the body and detachable under the action of the fixing screw.

BACKGROUND OF THE INVENTION

A dowel of the forenoted type is for example used for fixing a component to a for example, plasterboard consisting of a core of friable material, plaster between two layers of board. The difficulty in fixing a component to it, and in particular a heavy component, lies in the tendency of the plaster to crumble and the tendency of the layers the board to tear easily. This difficulty is overcome by a dowel of the type defined above provided, in addition, with a piercing end, either on the body or on the rocker, and a thread on the body for first of all fixing the dowel in the sheet and then preventing, after the fixing of the component, the rotation of the dowel in the event of the unscrewing of the fixing screw. Such a dowel could be produced by moulding the body in zinc and stamping the rocker from a piece of metal or again by moulding the body and rocker separately from plastic material.

OBJECT OF THE INVENTION

The present application aims first of all to propose an easier solution to the problem of producing the dowel defined above.

SUMMARY OF THE INVENTION

To this end, the invention relates to a method of producing the dowel of the type defined above, characterised by the fact that the body and rocker are moulded simultaneously from injectable material.

Preferably, the body and rocker are moulded in a single piece, the parts of the mould corresponding to the rocker being fed at least through a feed bridge, or duct, comprising the portions of the mould corresponding to the means for temporarily holding the rocker in the insertion position which are formed at the free end of at least one of the lateral arms of the body.

Advantageously the dowel is moulded by means of two dies joined along a first plane of symmetry of the body extending between its lateral arms.

In this case, the bore through which the fixing screw passes can be produced in the body by means of a spindle which is inserted between the two dies along the axis of the tubular body to be formed.

Advantageously, the entire dowel is moulded by means of the two dies, the axial spindle of the screw passage bore, and two slides which are inserted laterally between the two dies and in opposite directions along the said first plane of symmetry of the body and at right angles to the spindle.

In the actual implementation of the method of the invention, the dowel body is formed by means of the two dies, the screw passage bore by means of the axial spindle, and the rocker by means of the two lateral slides.

Thus it is possible to provide a pair of double dies, two pairs of lateral slides and two axial spindles which are inserted in opposite directions, in order to form two dowel sets simultaneously.

The invention also relates to the dowel with a rocker produced according to the method of the present application, characterised by the fact that the means of temporarily holding the rocker in the insertion position comprise at least one shearable pin which, when the dowel is inserted in the wall, drives the rocker with the body.

Advantageously, it is formed by shearable holding pins at the free ends of the arms of the body.

Advantageously still, the rocker pivots are formed close to the free ends of the arms of the body, preferably short of it, and have a larger cross section than the holding pin or pins.

Advantageously again, these pivots are formed almost at the ends of the grooves in the arms of the body. It would also and conversely be possible to provide the holding pins short of the pivots.

Preferably, the lever arms formed between the pivots and pins are approximately half as long as the lever arms formed between the pivots and the ramp on the rocker which interacts with the screw.

In the actual embodiment of the dowel of the invention, piercing, or drilling, means are provided at the end of the rocker, lying substantially in a first plane of symmetry of the body disposed between the lateral arms.

Preferably again, the orifice in the rocker has internal ribs on which the thread of the fixing screw is designed to come into engagement, and the ramp for interacting with the screw is hollowed out to avoid the tip of the screw becoming stuck within it.

BRIEF DESCRIPTION OF DRAWINGS

The invention will be understood better by means of the following description of the dowel of the invention and the mould dies, spindle and slides used for its moulding, with reference to the accompanying drawings in which like reference characters designate like or corresponding parts throughout the several views, and wherein:

FIG. 6 shows an exploded bottom rear perspective view of the mould dies, spindle and moulding slides after moulding of the dowel;

DETAILED DESCRIPTION OF THE PREFERRED EMBODIMENT

Figure 1:
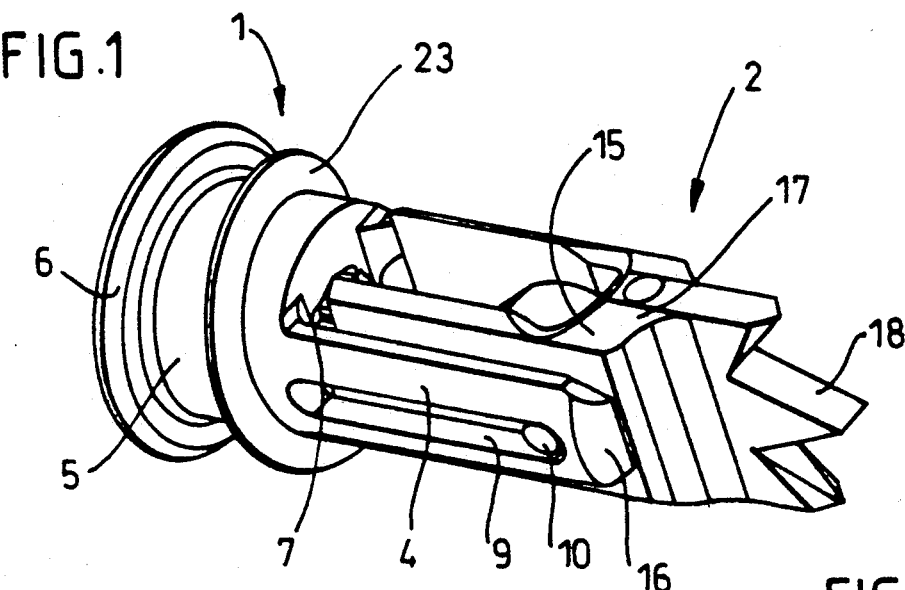
FIG. 1 is a front and top perspective view of the dowel taken from the mould.
Figure 2:
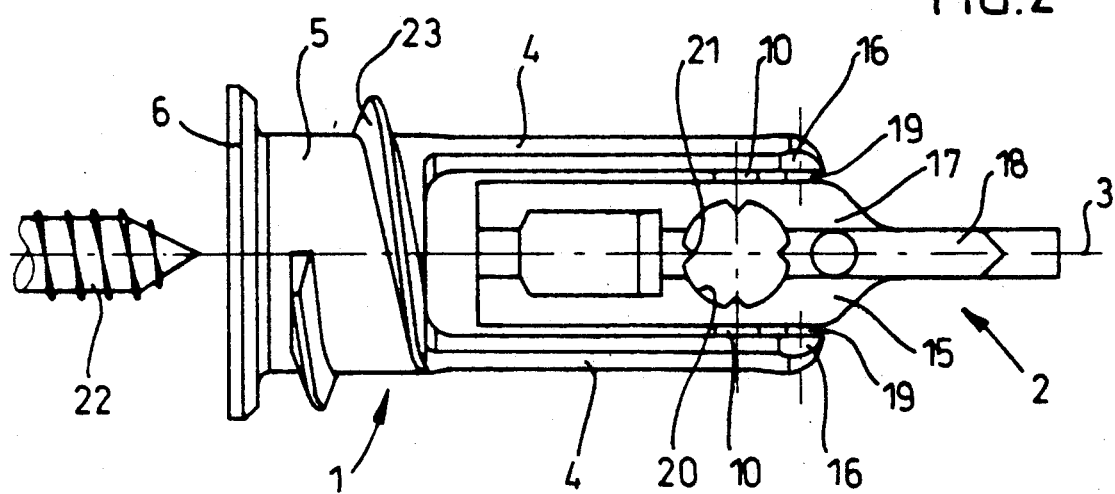
FIG. 2 shows a bottom view of the dowel.
Figure 3:
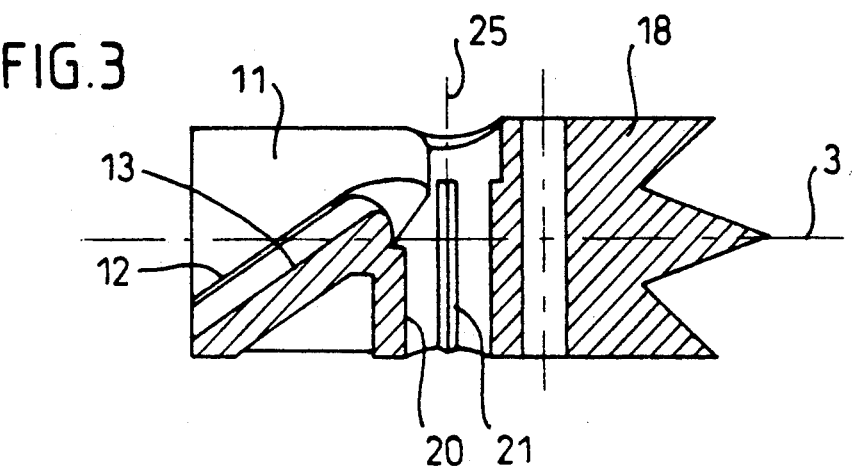
FIG. 3 shows a view in cross section, along its plane of symmetry, of the dowel rocker.
Figure 4:
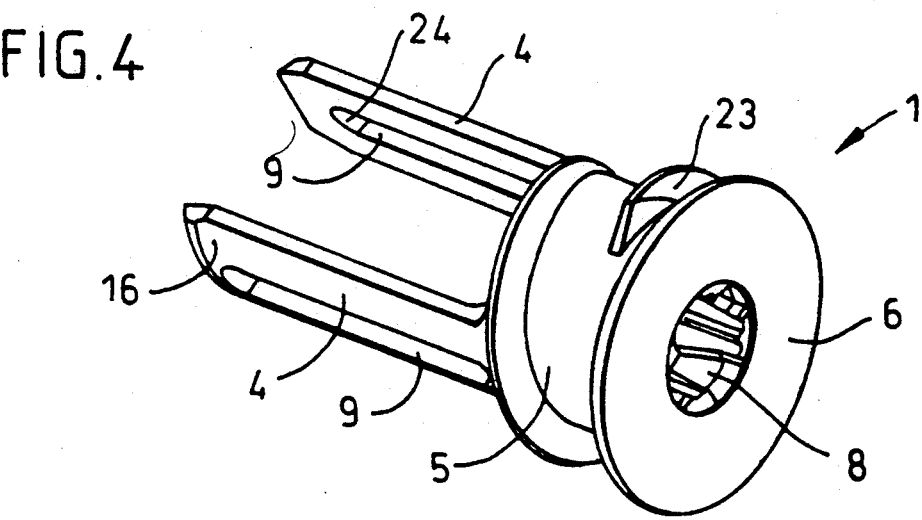
FIG. 4 shows a rear perspective view of the top of the dowel body.
Figure 5:
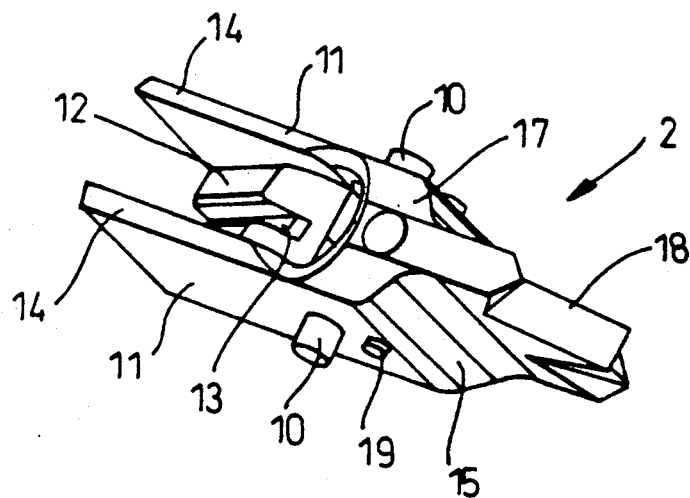
FIG. 5 shows a front perspective view of the top of the dowel rocker.
Figure 8:
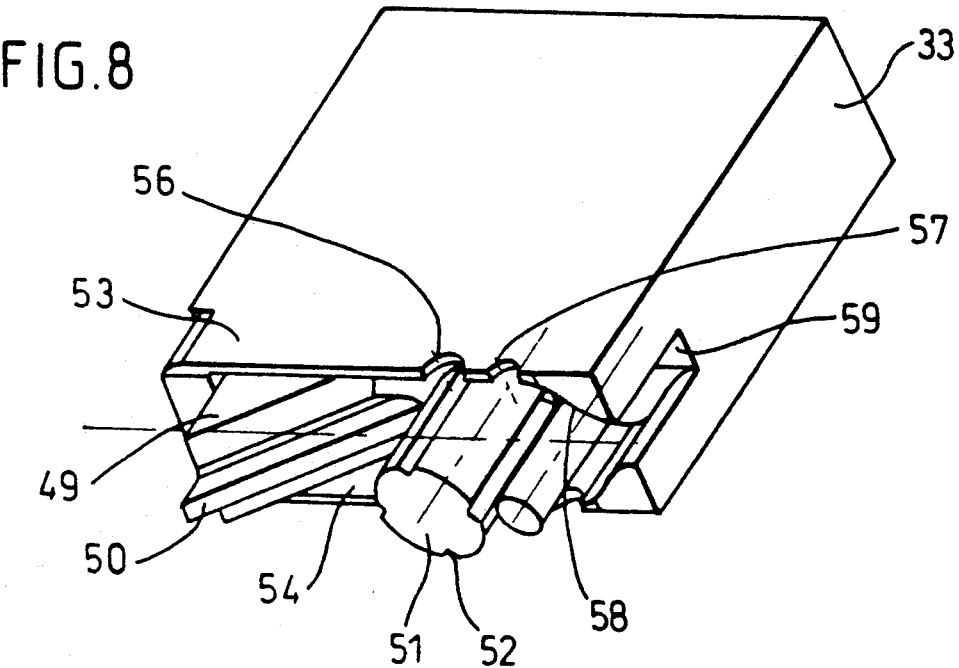
FIG. 8 shows a bottom perspective view of the lateral slide for moulding the ramp and the orifice for interacting with the rocker screw.
Figure 7:
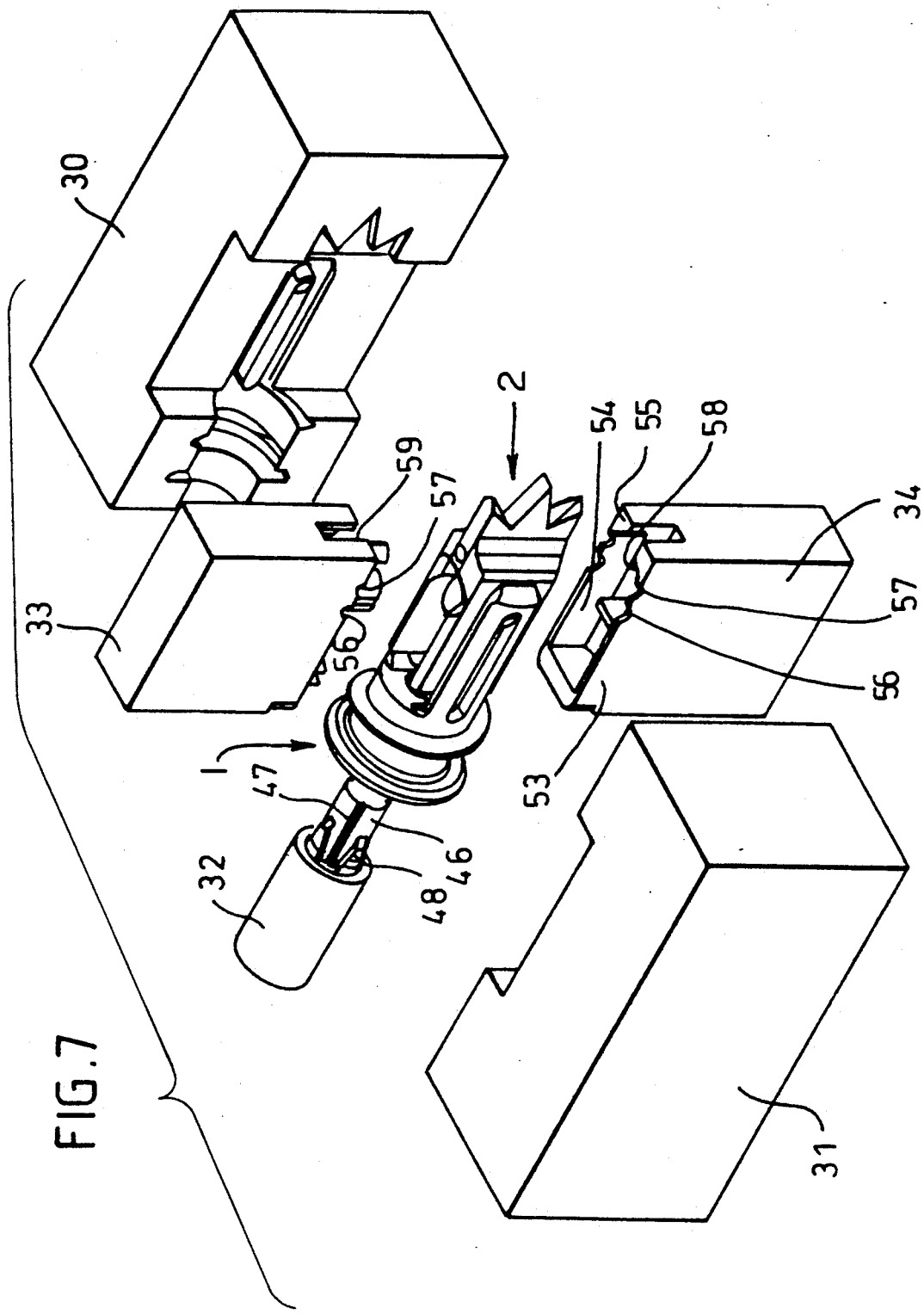
FIG. 7 shows an exploded top front perspective view of the components of FIG. 6.

The dowel which will now be described was produced a a single piece from injectable material, in this case zinc alloy, by injection into a mould consisting of dies, a spindle and slides which will be described subsequently.

The dowel has a body i and a rocker 2.

The body 1 is generally tubular in shape, with an axis 3, with two planes of quasi-symmetry orthogonal and secant along the axis 3, planes which, for the purpose of simplification, will be termed planes of symmetry in the remainder of the description. Symmetrical with respect to a first one of these two planes, two elongate lateral arms 4 extend the periphery of a rear shank 5 provided, at the rear, with a bearing collar 6.

A bore 7, for a fixing screw 22 to pass through, passes right through the shank 5 to open out between the arms 4. The rear part 8 of the bore 7, adjacent to the collar 6, has a configuration of the Phillips or Posidrive type, for rotating the body by means of a suitable tool. The external wall of the shank 5 bears a helical thread 23 for profixing the dowel, intended, after fixing, to prevent its rotation. In each of the arms 4 an oblong groove 9 is provided, extending parallel to the axis 3 and in which is engaged a pivot 10 on the rocker 2, for tilting and sliding it.

The rocker 2 has a plane of symmetry which is the same as the plane of symmetry of the body 1, on each side of which lie the arms 4.

The rocker 2 has two cheeks 11 with a length substantially equal to the grooves 9 in the arms 4, between which an internal ramp 12 is formed, inclined to the axis 3 and passing through the second plane of symmetry of the body 1, designed to interact with the screw 22 to bring about the pivoting of the rocker.

To prevent the screw "sticking" into the ramp 12, the latter is hollowed out so as to have a groove 13 for receiving the tip of the screw 22.

Upon removal from the mould, the cheeks 11 of the rocker lie parallel to the arms 4 of the body, with their free rear ends 14 close to the shank 5 of the body and their front ends 15 substantially at the level of the free front ends 16 of the arms 4, these front ends 15 of the rocker being joined in a transverse connection zone 17, conferring on the rocker a stirrup shape and serving as a base for a front piercing projection 18, in this case with three front teeth, lying substantially in the plane of symmetry of the rocker.

The two pivots 10 on the rocker project laterally out of the cheeks of the rocker, Just short of the zone 17. On removal from the mould, the pivots 10 are practically against the front ends 24 of the grooves 9.

Two pins 19, projecting laterally out of the zone 17 where the cheeks 11 of the rocker are connected, beyond the pivots 10, in this case join the rocker and the front ends 16 of the arms 4 of the body so as, on removal from the mould and in the position in which the dowel is inserted into a wall, to prevent the pivoting of the rocker.

The ramp 12 extends, towards the rear, the wall of a transverse orifice 20, with an axis 25, in the plane of symmetry of the rocker, orthogonal to the axis 3, designed to interact, beyond the ramp 12, with the fixing screw 22. The wall of this orifice 20 is provided, for this purpose, with internal ribs 21 on which the screw 22 is designed to engage.

The pivots 10 have in this case a cross section which is greater than that of the pins 19. The distance between the pivot 10 and the pin 19 on each cheek 11 is approximately equal to half the axial distance between the pivots 10 and the rear of the ramp 12.

To fix a component to a wall, the dowel is first of all fixed to it. Using a suitable tool, which is inserted into the part 8 of the bore 7 in the body 1, the dowel is rotated, which, by means of its projection 18, drills a hole in the wall. In this respect, the dowel can be termed self-tapping. The driving of the dowel is continued, the body 1, and the rocker 2 along with it, by virtue notably of the pins 19, being screwed into the wall until the collar 6 comes to bear against the wall.

Then the component to be fixed is placed on the collar 6 and the screw 22 is inserted, first of all through a bore which has previously been made in the component and then through the bore 7 in the shank 5 of the body 1.

When the screw 22 has reached the ramp 12 on the rocker, then in a position referred to as the insertion position in which it is aligned with the arms 4 of the body, the screw continues to be pushed, which, sliding along the ramp 12 after shearing the pins 19, that is to say detaching them from the rocker 2, by virtue of the lever arms between the pivots 10 and the rear of the ramp 12, causes the rocker 2 to pivot about the pivots 10 into a tilted position in which it is perpendicular to the arms 4 of the body 1. Beyond the ramp. 12, the screw 21, which continues to be driven forwards, enters the orifice 20 and comes into engagement with its ribs 22 in which it is screwed so as to cause the pivots 10 to slide in the grooves 9 and therefore to slide, or push, the rocker 2 towards the shank 5 of the body 1 perpendicularly to the arms 4 of the body 1, from the tilted position to a fixing position in which it is bearing against the wall.

The dowel has therefore been moulded by injection in a mould in this case consisting of a pair of identical and complementary dies 30, 31 for moulding the body 1, an axial spindle 32 for moulding the part 8 of the bore 7 of the body i and two lateral slides 33, 34 for moulding the rocker 2.

The two dies 30, 31 are joined along a parting line 35 in which the first plane of symmetry of the body 1 will lie. Each of the dies includes the impression of one half of the body, with a cylindrical cavity 41 for a part of the axial cylindrical spindle 32, a circular cavity 36 for the collar 6, a helical cavity 37 for the thread 23, a cylindrical cavity 38 for the shank 5, a roughly annular cavity 39 for an arm 4, provided from a flat internal wall 40 recessed with respect to the parting line 35, a small cylindrical cavity 42 for the pivot 10, provided from the portion of wall 40 inside the internal cavity 39 and corresponding to the groove 9, and a cavity 43, provided from the portion of wall 44 of the parting line 35, opposite to the portion 45 for the cavities of the collar, thread and shank, with respect to the wall 40 for the arm, for the piercing projection 18.

The axial spindle 32 bears a tapered stem 46 provided with fine axial grooves 47 and coarse trapezoidal axial ribs 48, shorter than the grooves 47, for the moulding of the part 8 of the bore 7 of the body 1.

The top lateral slide 33 includes the impression of the ramp and orifice 20, with a projection with a triangular profile 49, for the ramp 12, bearing, towards the bottom, a rib 50, for the groove 13, and a projecting cylindrical stem 51, with grooves 52, for the orifice 20 and its ribs 21.

The slides 33, 34 are parallelepipedal, with a width equal to the distance between the two walls 40 of the two dies 30, 31 once joined and with a length equal to the distance between the two portions of wall 44, 45 of the dies 30, 31, so as to be inserted laterally and in opposite directions between the two dies 30, 31.

The slides 33, 34 each have two longitudinal side walls 53, 54, for providing the spaces between the arms 4 of the body 1 and the cheeks 11 of the rocker 2.

The two slides 33, 34 are joined along a second parting line 55 in which the second plane of symmetry of the body 1 lies.

The walls 53, 54 of the two slides have circular recesses 57, 56 for moulding the pins 19 and a part of the pivots 10 respectively.

The slides 33, 34 are internally hollowed according to a shaped recess at 58 to form the zone 17 for connecting the cheeks 11 of the rocker.

The slides 33, 34 have a transverse opening 59 for the piercing projection 18.

In order to mould a sound dowel, the injection of material into the parts of the mould, which must be as rapid as possible, takes place from several feed points.

But it must be emphasised here that the parts of the mould corresponding to the rocker 2 are fed at least through the ducts formed by the circular recesses 57 for moulding the shearable pins 19 for the temporary holding of the rocker.

Because of this, that is to say because of the fact that these pins are produced by a unidirectional flow of material, and not by an accumulation of material, a perfect sizing of these pins is provided, in a reproducible fashion, and, in consequence, their shearing is ensured under the force for which their cross section has been determined. It is a case of good injection conditions.

Portions of helical thread can be provided on the arms 4 of the body 1.

Obviously, many modifications and variations of the present invention are possible in light of the above teachings. It is therefore to be understood that within the scope of the appended claims, the present invention may be practiced otherwise than as specifically described herein.

We claim:

1. A dowel with a rocker for fixing a component to a support wall, comprising:
   a body (1) having a generally tubular shape, two elongate lateral arms (4) each having a groove (9), and a bore (7) defining a passageway interposed between said arms (4) for receiving a screw (22) for fixing said component to said dowel and for fixing said dowel to said support wall;
   a rocker (2) slidably and pivotably mouned upon said arms (4) of said body (1) by means of two pivots (10) located within said grooves (9) of said arms (4), said rocker (2) having a ramp (12) for interacting with said screw (22) so as to cause said rocker (2) to pivot from a first position, when said dowel is inserted into said support wall, at which said rocker (2) is aligned with said arms (4), to a second position at which said rocker (2) is perpendicular to said arms (4), said rocker (2) also having an orifice (20) for interacting with said fixing screw (22), when said rocker (2) is disposed at said second position, so as to cause said rocker (2) to slide perpendicularly with respect to said arms (4) of said body (1) toward a fixing position at which said dowel and said component will be fixed upon said support wall; and
   frangible means (19) integrally interconnecting said rocker (2) and said body (1) for temporarily holding said rocker (2) in said first position when said dowel is inserted within said support wall and prior to insertion of said screw (22) within said bore (7) of said body (1) and engagement of said screw (22) with said ramp (12) of said rocker (2) so as to insure movement of said rocker (2) along with said body (1) upon insertion of said dowel within said support wall, and for releasing said rocker (2) from said first position as a result of said engagement of said fixing screw (22) with said ramp (12) of said rocker (2) so as to permit said rocker (2) to move to said second position perpendicular to said arms (4).

2. Dowel according to claim 1, wherein piercing means (18) are provided at the end of the rocker (2), lying substantially in a first plane of symmetry of the body (1) disposed between the lateral arms (4).

3. Dowel according to claim 1, wherein said orifice (20) in the rocker (2) has internal ribs (21) on which the thread of the fixing screw (22) is designed to come into engagement.

4. Dowel according to claim 1, wherein said ramp (12) for interacting with the screw (22) is hollowed out for receiving a tip portion of said fixing screw (22)

5. A dowel as set forth in claim 1, wherein:
   said means for temporarily holding said rocker (2) comprises at least one shearable pin (19).

6. Dowel according to claim 5, wherein:
   said at least one shearable pin (19) comprises a pair of shearable holding pins (19) formed at free ends (16) of said arms (4) of said body (1).

7. Dowel according to claim 6, wherein lever arms formed between the pivots (10) and the pins (19) are approximately half as long as lever arms formed between the pivots (10) and the ramp (12) on the rocker (2) which interacts with the screw (22).

8. Dowel according to claim 7, wherein said rocker pivots (10) are formed close to the free ends (16) of the arms (4) of the body.

9. A dowel according to claim 8, in which:
   said rocker pivots (10) are disposed at positions closer to said bore (7) than that of said holding pins (19).

10. Dowel according to claim 9, in which the rocker pivots (10) have a cross section larger than that of the holding pins (19).

11. Dowel according to claim 10, in which the pivots (10) are disposed near end portions (24) of the grooves (9) in the arms (4) of the body (1).

12. A method of producing a dowel with a rocker for fixing a component to a support wall, comprising the steps of:
   providing die means for forming said dowel with a body (1) having a generally tubular shape, two elongate lateral arms (4) each having a groove (9), and a bore 97) defining a passageway interposed between said arms (4) for receiving a screw (22) for fixing said component to said dowel and for fixing said dowel to said support wall; a rocker (2) slidably and pivotably mounted upon said arms (4) of said body (1) by means of two pivots (10) located within said grooves (9) of said arms (4), said rocker having a ramp (12) for interacting with said screw (22) so as to cause said rocker (2) to pivot from a first position, when said dowel is inserted into said wall, in which said rocker is aligned with said arms (4), to a second position in which said rocker is perpendicular to said arms (4), said rocker (2) also having an orifice (20) for interacting with said fixing screw (22), when said rocker (2) is disposed at said second position, so as to cause said rocker (2) to slide perpendicularly with respect to said arms (4) of said body toward a fixing position at which said dowel and said component will be fixed upon said support wall; and means (19) for temporarily holding said rocker (2) in said first position between said arms (4) of said body (1) prior to insertion of said screw (22) within said bore (7) of said body (1) and engagement of said screw (22) with said ramp (12) of said rocker (2), and for releasing said rocker (2) from said first position as a result of said engagement of said fixing screw (22) with said ramp (12) of said rocker so as to permit said rocker (2) to move to said second position perpendicular to said arms (4); and injecting injectable mouldable material into said die means for simultaneously moulding said body (1) and said rocker (2) from said injectable mouldable material.

13. A method as set forth in claim 1, wherein:
said rocker (2) is also formed at a forward, free end portion thereof with a piercing means (18) for rendering said dowel self-tapping with respect to said support wall.

14. A method as set forth in claim 1, wherein:
said orifice (20) of said rocker (2) is provided with rib means (21) for threaded engagement with said fixing screw (22).

15. Method according to claim 1, wherein said holding means (19) are formed at a free end (16) of at least one of the lateral arms (4) of the body (1).

16. Method according to claim 1, wherein said dowel body (1) is moulded by means of two dies (30, 31) joined along a first plane (35) of symmetry of the body lying between its lateral arms (4), the bore (7) through which the fixing screw (22) passes in the body is moulded by means of a spindle (32) which is inserted between the two dies (30, 31) along the axis (3) of the tubular body (1) to be formed, and the rocker (2) is moulded by means of two slides (33, 34) which are inserted laterally between the two dies (30, 31) and in opposite directions along said first plane (35) of symmetry of the body and orthogonally with respect to the spindle (32).

17. Method according to claim 1, in which the body (1) and rocker (2) are moulded in a single piece.

18. Method according to claim 2, in which the injection into the parts of the die means corresponding to the rocker (2) takes place at least through a feed bridge comprising mould portions (57) corresponding to the means (19) for temporarily holding the rocker (2) in the insertion position.

* * * * *